(12) United States Patent
Thielert et al.

(10) Patent No.: US 10,647,577 B2
(45) Date of Patent: May 12, 2020

(54) METHOD AND DEVICE FOR PRODUCING SULFURIC ACID

(71) Applicants: THYSSENKRUPP INDUSTRIAL SOLUTIONS AG, Essen (DE); thyssenkrupp AG, Essen (DE)

(72) Inventors: Holger Thielert, Dortmund (DE); Zion Guetta, Dortmund (DE)

(73) Assignees: THYSSENKRUPP INDUSTRIAL SOLUTIONS AG, Essen (DE); THYSSENKRUPP AG, Essen (DE)

(*) Notice: Subject to any disclaimer, the term of this patent is extended or adjusted under 35 U.S.C. 154(b) by 0 days.

(21) Appl. No.: 15/754,388

(22) PCT Filed: Sep. 1, 2016

(86) PCT No.: PCT/EP2016/070605
§ 371 (c)(1),
(2) Date: Feb. 22, 2018

(87) PCT Pub. No.: WO2017/037167
PCT Pub. Date: Mar. 9, 2017

(65) Prior Publication Data
US 2018/0244522 A1    Aug. 30, 2018

(30) Foreign Application Priority Data
Sep. 4, 2015 (DE) .................. 10 2015 114 871

(51) Int. Cl.
*C01B 17/765*    (2006.01)
*C01B 17/79*    (2006.01)
*B01J 19/24*    (2006.01)

(52) U.S. Cl.
CPC ......... *C01B 17/7655* (2013.01); *B01J 19/245* (2013.01); *C01B 17/79* (2013.01); *B01J 2219/00103* (2013.01); *B01J 2219/24* (2013.01)

(58) Field of Classification Search
None
See application file for complete search history.

(56) References Cited

U.S. PATENT DOCUMENTS

| 2,520,454 A | 8/1950 | Carter |
| 3,443,896 A | 5/1969 | Furkert |

(Continued)

FOREIGN PATENT DOCUMENTS

| DE | 3713219 A | 11/1988 |
| DE | 69813528 T | 4/2004 |

(Continued)

OTHER PUBLICATIONS

English Translation of International Search Report issued in PCT/EP2016/070605, dated Nov. 21, 2016 (dated Dec. 2, 2016).

(Continued)

*Primary Examiner* — Sheng H Davis
(74) *Attorney, Agent, or Firm* — thyssenkrupp North America, LLC.

(57) ABSTRACT

In a production mode a process for preparing sulfuric acid may involve oxidizing sulfur to sulfur dioxide in a first oxidation stage, and catalytically oxidizing the sulfur dioxide to sulfur trioxide in a second oxidation stage. The sulfur trioxide may be absorbed in at least one absorption stage. In the production mode, process gases from a last of the at least one absorption stage with respect to a flow direction are discharged. In a standby mode of the process, at least one heating stage for heating the process gases is connected. The process gases exiting from the at least one absorption stage (Continued)

are conveyed to the heating stage, and the process gases are circulated via the heating stage, the second oxidation stage, and the absorption stage.

6 Claims, 2 Drawing Sheets

(56) References Cited

U.S. PATENT DOCUMENTS

| | | | | |
|---|---|---|---|---|
| 3,907,979 | A | * | 9/1975 | Jenniges ............. C01B 17/7655 423/522 |
| 5,593,652 | A | | 1/1997 | Peng |
| 5,624,653 | A | * | 4/1997 | Grozev ............... C01B 17/7655 422/160 |
| 7,361,326 | B2 | * | 4/2008 | Christensen ........ C01B 17/7655 423/522 |
| 2012/0171110 | A1 | * | 7/2012 | Schoeneberger ....... C01B 17/79 423/522 |

FOREIGN PATENT DOCUMENTS

| | | | |
|---|---|---|---|
| JP | 52050992 | * | 4/1977 |
| JP | S5250992 A | | 4/1977 |

OTHER PUBLICATIONS

Akaike K; Muto A. et al.; Heating sulphuric acid plant during shut-down—to prevent catalyst degradation and corrosion; XP002764449; vol. 1977, Nr: 22 (1977).

* cited by examiner

METHOD AND DEVICE FOR PRODUCING SULFURIC ACID

CROSS REFERENCE TO RELATED APPLICATIONS

This application is a U.S. National Stage Entry of International Patent Application Serial Number PCT/EP2016/070605, filed Sep. 1, 2016, which claims priority to German Patent Application No. DE 10 2015 114 871.4, filed Sep. 4, 2015, the entire contents of both of which are incorporated herein by reference.

FIELD

The present disclosure generally relates to sulfuric acid, including processes and apparatuses for preparing sulfuric acid in two oxidization stages.

BACKGROUND

Processes and apparatuses for preparing sulfuric acid are known in various embodiments from industrial practice. In this preparation or industrial preparation of sulfuric acid, a catalytic oxidation of sulfur dioxide to sulfur trioxide takes place. Here, vanadium pentoxide ($V_2O_5$) is generally used as catalyst. Such catalysts are active only above particular relatively high temperatures. Thus, vanadium pentoxide is active only above a temperature of about 410° C. On particular occasions, for example for maintenance of the apparatus, the production of sulfuric acid has to be interrupted. Nevertheless, the apparatus should be kept hot during such a production downtime in order to avoid, in particular, condensation of sulfuric acid and corrosion resulting therefrom. Furthermore, the catalyst firstly has to be heated to the required activation temperature on starting up such an apparatus.

Keeping such an apparatus hot or heating it during a production downtime and also on starting up the apparatus using heated and dried atmospheric air is known from the prior art. Here, humid atmospheric air from the surroundings is dried with the aid of concentrated sulfuric acid. For this purpose, relatively large amounts of concentrated sulfuric acid have to be kept in stock in a disadvantageous manner and correspondingly large sulfuric acid tanks are required for this purpose. In order to avoid corrosion, the sulfuric acid used for drying the air has to have a concentration of not less than about 93%. Adhering to this limit is frequently problematical. If moisture or humid atmospheric air intrudes into the apparatus, the corresponding water forms sulfuric acid or dilute sulfuric acid by reaction with the sulfur trioxide present in the apparatus components and the result can be considerable corrosion which, at least in the long term, can bring the usability of apparatus components into question.

Thus a need exists for a process by means of which the flow paths and the components of the apparatus concerned can be heated or kept hot in a simple manner with little outlay and in which the disadvantages indicated above can be avoided. A need also exists for a corresponding apparatus for carrying out this process.

DETAILED DESCRIPTION

Figure 1:
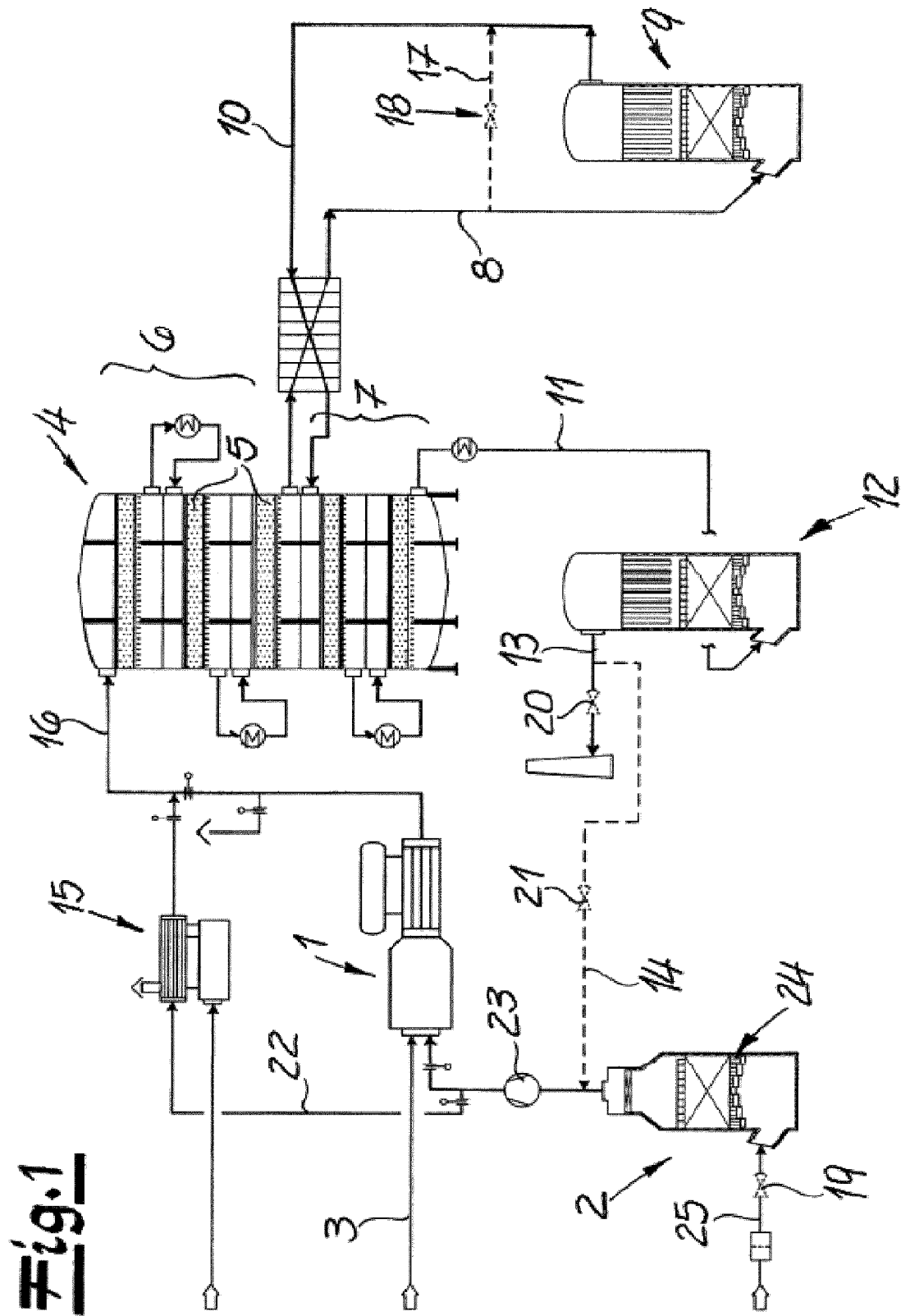
FIG. 1 is a flow diagram depicting an example apparatus for carrying out an example process.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to processes for preparing sulfuric acid. In some cases, sulfur may be oxidized to sulfur dioxide in a first oxidation stage and sulfur dioxide may be catalytically oxidized to sulfur trioxide in a second oxidation stage. The sulfur trioxide may be absorbed in at least one absorption stage so as to give sulfuric acid. The present disclosure further generally relates to apparatuses for performing such processes. Sulfuric acid may be produced by way of a contact process or a double contact process. The sulfuric acid can, for example, be used for producing phosphate-containing fertilizers or else for other purposes.

In some examples, in a production mode of a process of the present disclosure, sulfur is oxidized to sulfur dioxide in a first oxidation stage, the sulfur dioxide is catalytically oxidized to sulfur trioxide in a second oxidation stage and the sulfur trioxide is introduced into at least one absorption stage for absorption of the sulfur trioxide, with process gases being discharged from the last absorption stage in the flow direction, and in a standby mode of the process, at least one heating stage for heating the process gases arranged upstream of the second oxidation stage in the flow direction of the process gases is connected in, with the process gases exiting from the absorption stage being fed or recirculated to the heating stage and the process gas being circulated via the heating stage, the second oxidation stage and the at least one absorption stage.

According to the invention, the process gas present in the apparatus is circulated or conveyed in a circuit in the standby mode and the introduction of atmospheric air or dried atmospheric air from the outside is in principle not necessary. The gas or process gas present in the plant is circulated at least via the heating stage, the second oxidation stage and the at least one absorption stage. It is in principle possible within the scope of the invention for the process gas to be able to be replaced gradually by nitrogen or by technical-grade nitrogen.

For the purposes of the invention, standby mode means, in particular, interruption of sulfuric acid production and thus a production downtime in which the apparatus/plant and especially also the catalyst in the second oxidation stage has to be kept hot. The heating stage according to the invention makes an effective contribution thereto. However, according to a recommended embodiment of the invention, standby mode also means a start-up procedure and/or a shutdown procedure for the apparatus of the invention, in which procedures the same conditions apply in principle as in the standby mode in the case of a production downtime of the plant. According to a preferred variant of the invention, only the process gas in the heating stage is gradually heated or cooled, or heated or cooled stepwise, in the case of a start-up procedure or a shutdown procedure of the apparatus, in contrast to the production downtime.

In the standby mode or in the keeping-hot operation of the apparatus, the hot process gas keeps plant components above the dew point of sulfuric acid and, in addition, the temperature in the second oxidation stage is advantageously kept above the activation temperature of the catalyst. It is possible within the scope of the invention for gas from the second oxidation stage to consist essentially of nitrogen ($N_2$), of oxygen ($O_2$) and of traces of sulfur dioxide ($SO_2$), sulfur trioxide ($SO_3$) and water ($H_2O$) in the standby mode. Furthermore, it is possible within the scope of the invention for $SO_3$ and water to be absorbed from the process gas in the absorption stage or in the final absorption stage so that no condensation of $SO_3$ and water in the form of sulfuric acid occurs in the plant.

In the production mode of the process, sulfur and air for oxidation or combustion of the sulfur are preferably fed to the first oxidation stage. Here, the air is advantageously introduced into the first oxidation stage via at least one drying apparatus, preferably in the form of a drying tower. It is possible within the scope of the invention for the introduction of sulfur into the first oxidation stage to be stopped in the standby mode of the process and for the supply of air to the first oxidation stage to be at least throttled back, but preferably stopped or essentially stopped. According to one variant, the supply of air is throttled back and preferably interrupted by means of a shut-off element arranged upstream of the drying apparatus.

In comparison with the production mode, the at least one heating stage is, according to the invention, connected in during the standby mode of the process. In a particularly recommended embodiment of the process of the invention, the process gases are, in the standby mode, conveyed from the last absorption stage in the flow direction or from the final absorption stage to the heating stage with bypassing of the first oxidation stage and from the heating stage are conveyed to the second oxidation stage. In the heating stage, the process gases are heated, preferably to a temperature in the range from 400° C. to 600° C., for example to a temperature of about 500° C.

A particularly preferred embodiment of the invention is characterized in that the second oxidation stage has a plurality of parts or stages. The process gases are, after passing through a first part of the second oxidation stage, advantageously discharged from the second oxidation stage, preferably both in the production mode and in the standby mode of the process. In the production mode of the process, the process gases discharged from the second oxidation stage are conveyed through at least one, preferably one, intermediate absorption stage and subsequently recirculated to the second oxidation stage where they then pass through a second part of the second oxidation stage. It is advisable for sulfur trioxide to be absorbed from the process gases in the intermediate absorption stage. For this purpose, the process gases are advantageously conveyed in countercurrent to a fluid, preferably in countercurrent to dilute sulfuric acid, for example 98.5% strength sulfuric acid, in the intermediate absorption stage. As a result of the absorption of the sulfur trioxide, this sulfuric acid is concentrated and concentrated sulfuric acid can thus be taken off from the bottom of the intermediate absorption stage. The sulfur dioxide-containing process gas leaving the intermediate absorption stage again is recirculated to the second oxidation stage and there passed through a second part of the second oxidation stage. In the standby mode of the process, in contrast, the process gases discharged from the second oxidation stage or the process gases discharged after passing through the first part of the second oxidation stage are preferably recirculated via a closeable bypass conduit to the second oxidation stage, bypassing the at least one intermediate absorption stage. Here, the process gases recirculated via the bypass conduit can then flow through the second part of the second oxidation stage. It is recommended that the bypass conduit is closeable by means of at least one shut-off element. Thus, this shut-off element in the bypass conduit can be closed to set the production mode and this shut-off element in the bypass conduit is opened to set the standby mode.

Within the scope of the invention, it is possible for the process gases after passing through the second part of the second oxidation stage to be introduced into the at least one absorption stage or into the final absorption stage, both in the production mode and in the standby mode of the process.

In the standby mode of the process, the discharge of the process gases from the last absorption stage in the flow direction or from the final absorption stage is advantageously at least throttled back, but preferably stopped. The process gases are, according to the invention, instead introduced into the heating stage and heated there.

To solve the technical problem, the invention also teaches an apparatus for preparing sulfuric acid, wherein a first oxidation facility for producing sulfur dioxide and also a second oxidation facility connected thereto for oxidation of the sulfur dioxide to sulfur trioxide is provided and at least one absorption apparatus, in particular at least one absorption tower, for the absorption of the sulfur trioxide is connected to the second oxidation facility, with the last absorption apparatus in the flow direction of the process gas (final absorption apparatus or final absorption tower) for the process gas discharged from the absorption apparatus having at least one closeable discharge conduit and at least one closeable process gas conduit, with the discharge conduit being opened and the process gas conduit being closed in the production mode of the apparatus so that process gas is discharged from the apparatus and the discharge conduit being closed and the process gas conduit being opened for circulation of the process gas in the standby mode of the apparatus. The process gas conduit is connected to a heating device (heating stage) for heating the process gas and the heating device is connected via a connection conduit to the second oxidation facility. In the standby mode of the apparatus, the heated process gas from the heating device is introduced into the second oxidation facility. Furthermore, in the standby mode of the apparatus, the process gas is circulated at least via the heating device, the second oxidation facility and the at least one absorption apparatus (final absorption apparatus).

In a preferred embodiment of the apparatus of the invention, at least one blower is provided, with oxygen or air for oxidation of the sulfur being able to be fed to the first oxidation facility by means of this blower in the production mode of the apparatus. It is recommended that in the standby mode, the process gas instead is conveyed by means of this blower from the process gas conduit to the heating device. Thus, the at least one blower can be actively used both in the production mode and in the standby mode. In the production mode, air is preferably conveyed with the aid of the blower to the first oxidation facility. It has already been stated above that sulfur is oxidized or burnt by means of atmospheric oxygen in the first oxidation facility in production mode. The first oxidation facility is advantageously configured as a combustion chamber. In the standby mode, the first oxidation facility is preferably bypassed in the path of the process gas and the process gas is preferably conveyed with the aid of the blower from the final absorption apparatus to the heating device. From the heating device, the process gas is introduced into the second oxidation facility in the standby mode.

It is within the scope of the invention for the second oxidation facility to be configured as a multistage convertor, in particular as a two-stage convertor. Furthermore, it is possible for the purposes of the invention for each convertor stage to have at least one catalyst tray, preferably a plurality of catalyst trays. It is advantageous for a first convertor stage to be connected via a process gas discharge conduit to an intermediate absorption apparatus and the intermediate absorption apparatus in turn to be connected via a process gas feed conduit to a second convertor stage. In this way, process gas from the first convertor stage can be conveyed through the intermediate absorption apparatus and introduced into the second convertor stage of the second oxidation facility in the production mode of the apparatus. In the first convertor stage, part of the sulfur dioxide introduced into the second oxidation facility is oxidized to sulfur trioxide and in the intermediate absorption apparatus, the $SO_3$-containing process gas is preferably conveyed in countercurrent to a fluid medium, preferably to dilute sulfuric acid, for example 98.5% strength sulfuric acid. The sulfur trioxide is absorbed by the sulfuric acid so that the sulfuric acid is at the same time concentrated in the intermediate absorption apparatus. The remaining process gas is, in the production mode, recirculated from the intermediate absorption apparatus via the process gas feed conduit into the convertor and then flows through the second convertor stage of the second oxidation facility.

In a particularly preferred embodiment of the invention, the process gas discharge conduit and the process gas feed conduit are connected to one another via at least one closeable bypass conduit. Here, the bypass conduit can advantageously be closeable by means of at least one shut-off element, for example a valve (bypass valve). In the production mode, the bypass conduit is closed. In the standby mode of the apparatus, the bypass conduit is in contrast opened so that process gas from the first convertor stage can be introduced via the bypass conduit, bypassing the intermediate absorption apparatus, into the second convertor stage of the second oxidation facility. As a result, heat losses in the intermediate absorption apparatus in the standby mode, in particular in the case of a keeping-hot procedure of the apparatus, are avoided.

The invention is based on the recognition that, in the process of the invention or in the apparatus of the invention, a simple and relatively uncomplicated standby mode can be realized by circulation of the process gas which is in any case present in the apparatus. In a temporary keeping-hot operation of the apparatus, for example for the purpose of maintenance work or repairs, and during start-up (heating-up) or shutdown (cooling down) of the apparatus, introduction of air from the outside is in principle not necessary and there is thus also no external source of moisture which would have to be compensated for by drying. Corrosion-free process gas circulation during the standby mode can be realized without problems by means of a relatively simple configuration of the gas path of the process gas. As a result of the effective and reliable keeping-hot of the apparatus components, in particular with the aid of the heating stage or the heating device, the condensation of sulfuric acid in the apparatus components can be effectively prevented, as can the corrosion resulting therefrom. In keeping-hot operation, optimal activation of the catalyst is ensured and the activation temperature can be maintained without problems. Compared to the measures known from the prior art which have been described at the outset, comparatively large amounts of concentrated sulfuric acid for drying are saved and correspondingly large sulfuric acid tanks thus also become superfluous. Overall, the process of the invention and the apparatus of the invention are characterized by simple and relatively uncomplicated operation, with emissions being largely minimized and the total costs also being able to be significantly reduced compared to the processes known from the prior art. This is also because the process of the invention can additionally be carried out advantageously from an energy point of view.

The figures schematically show a flow diagram of an apparatus according to the invention for carrying out a process for preparing sulfuric acid. In the following, the apparatus according to the invention will firstly be illustrated with reference to the embodiment of FIG. 1.

The apparatus comprises a first oxidation facility 1 for the oxidation or combustion of sulfur to form sulfur dioxide. For this purpose, an air feed apparatus 2 and a sulfur feed conduit 3 for the introduction of air and sulfur are connected to the first oxidation facility 1. It is within the scope of the invention for the first oxidation facility 1 and the air feed apparatus 2 and the sulfur feed conduit 3 to be active only in the production mode of the apparatus. The air fed in by means of the air feed apparatus 2 is, in the production mode, introduced via the air feed conduit 25 and the opened air feed valve 19 into the air drying device 24 and conveyed from there with the aid of the blower 23 to the first oxidation facility 1. The air drying device 24 is configured as an air drying tower in the working example.

In the production mode, the sulfur dioxide formed in the first oxidation facility 1 is introduced into the second oxidation facility 4 which is configured as a convertor having catalyst trays 5, with the sulfur dioxide being catalytically oxidized to sulfur trioxide ($SO_3$) in this convertor. The second oxidation facility 4 or the convertor preferably comprises, and as shown in the working example, two convertor stages 6, 7. In the working example, the sulfur dioxide is firstly conveyed through the first convertor stage 6, which here comprises three catalyst trays 5. After flowing through the first convertor stage 6, the process gas is, in the production mode, preferably and in the working example, introduced via a process gas discharge conduit 8 into the intermediate absorption apparatus 9. In the working example, the $SO_3$-containing process gas is here conveyed in countercurrent to dilute sulfuric acid, so that sulfur trioxide is absorbed by the sulfuric acid and the sulfuric acid is at the same time concentrated as a result. The remaining process gas is then advantageously, and as shown in the working example, reintroduced via the process gas feed conduit 10 into the second oxidation facility 4, in fact into the second convertor stage 7 thereof. After flowing through this second convertor stage 7, in which remaining sulfur dioxide is oxidized to sulfur trioxide, the process gas is then, as is recommended and shown in the working example, introduced via the connecting conduit 11 into the final absorption apparatus 12. Here too, the process gas is advantageously conveyed in countercurrent to dilute sulfuric acid, so that sulfur trioxide is absorbed by the sulfuric acid. The remaining process gas is preferably, and as shown in the working example, discharged at the upper end of the final absorption apparatus 12, in the production mode discharged from the process or from the apparatus via a closeable discharge conduit 13.

To implement the standby mode according to the invention, the final absorption apparatus 12 is connected via a process gas conduit 14 to the heating device 15 for heating the process gas. The heating device 15 is in turn connected via a connecting conduit 16 to the second oxidation facility 4 or to the first convertor stage 6 of the second oxidation facility 4, preferably and as shown in the working example, the process gas discharge conduit 8 is, to implement the standby mode, short-circuited to the process gas feed conduit 10 upstream of the intermediate absorption apparatus 9 by means of a closeable bypass conduit 17. The bypass conduit 17 is closeable by means of the bypass valve 18.

To switch over from the production mode to the standby mode, the air feed valve 19 for introduction of air into the first oxidation facility 1 is firstly closed. In addition, the discharge conduit 13 is closed by means of the discharge valve 20. Instead, the process gas conduit valve 21 is opened so that process gas can be conveyed from the final absorption apparatus 12 via the conduit 22 to the heating device 15. To assist this process gas route, the blower 23 provided in the production mode for the introduction of air is preferably activated, as also shown in the working example. In the heating device 15, the process gas is, for example, heated to a temperature of about 500° C. The process gas which has been heated in this way is then fed via the connecting conduit 16 to the second oxidation facility 4 or to the first convertor stage 6 of the second oxidation facility 4. Here, the process gas flows through the first convertor stage 6 and is then conveyed via the process gas discharge conduit 8 out of the second oxidation facility 4. In the standby mode, the bypass valve 18 of the bypass conduit 17 is opened and the process gas thus flows from the process gas discharge conduit 8 via the bypass conduit 17 into the process gas feed conduit 10, bypassing the intermediate absorption apparatus 9. By means of this process gas feed conduit 10, the process gas is again fed to the second oxidation facility 4 or the second convertor stage 7 of this second oxidation facility 4. After flowing through the second convertor stage 7, the process gas goes via the connecting conduit 11 into the final absorption apparatus 12. Here, residues of sulfur trioxide and water remaining in the process gas are absorbed. In contrast to the production mode, the process gas is then recirculated with the discharge valve 20 closed via the process gas conduit 14 with the process gas conduit valve 21 opened via the blower 23 to the heating device 15 and in this way continues to flow in the circuit. It is within the scope of the invention for the process gas to be gradually replaced by nitrogen.

Figure 2:
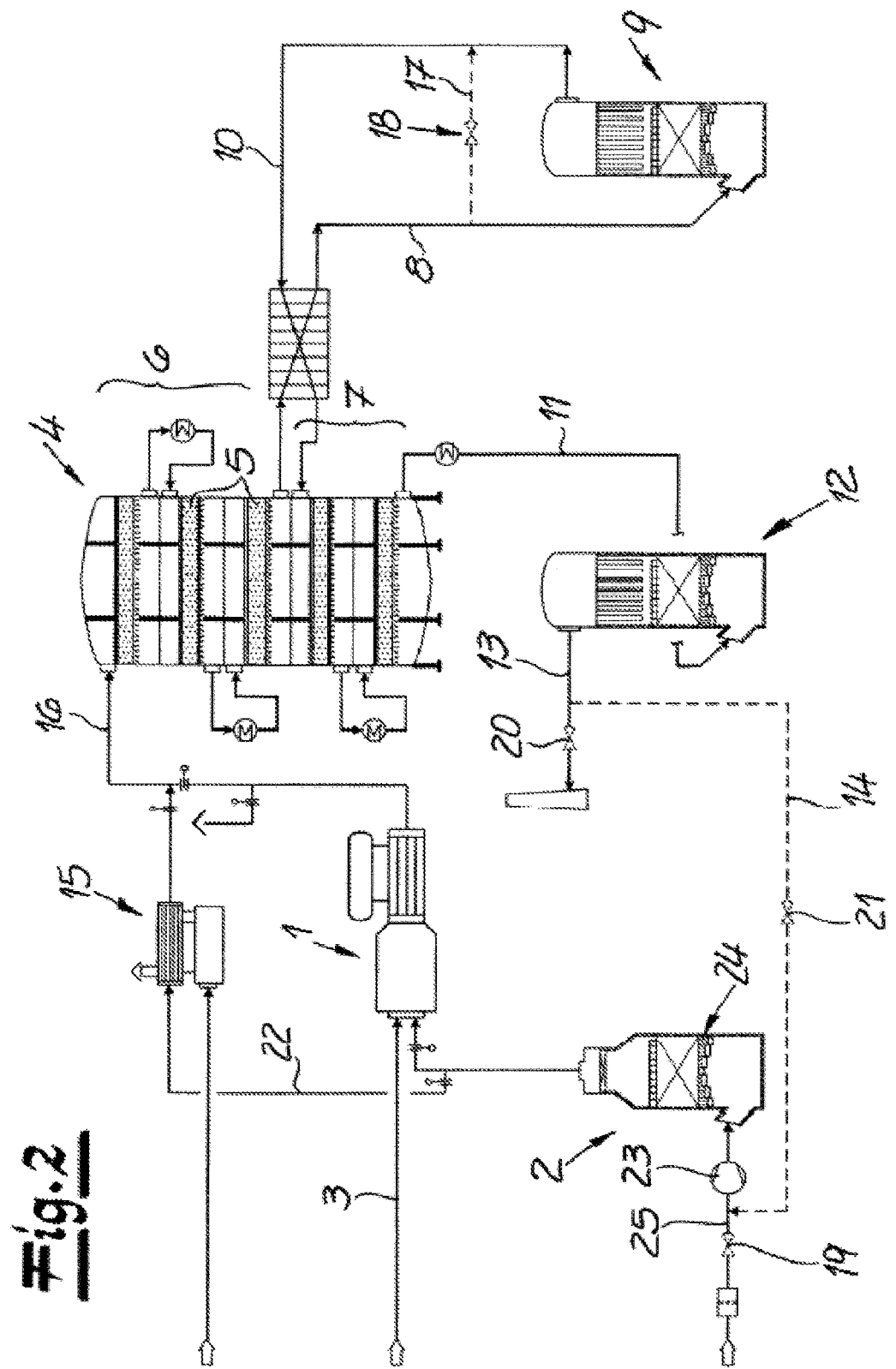
FIG. 2 is a flow diagram depicting another example apparatus for carrying out another example process.

The apparatus in the embodiment shown in FIG. 2 in principle operates like the apparatus in FIG. 1. The important difference compared to the working example of FIG. 1 is the connection of the process gas conduit 14 connected to the final absorption apparatus 12. In this embodiment, too, in order to switch over from the production mode into the standby mode, the air feed valve 19 for the introduction of air into the first oxidation facility 1 is firstly closed and the discharge conduit 13 is closed by means of the discharge valve 20. Here too, the process gas conduit valve 21 is opened so that process gas can be conveyed from the final absorption apparatus 12 via the conduit 22 to the heating device 15. However, the process gas is, in the standby mode of the embodiment shown in FIG. 2, introduced via the process gas conduit 14 with the process gas conduit valve 21 open into the air feed conduit 25 arranged upstream of the air drying device 24. In this embodiment, the blower 23 is also arranged upstream of the air drying device 24 in flow direction. With the air feed valve 19 closed, the process gas is conveyed by means of the blower 23 through the air drying device 24 and from there is conveyed further via the conduit 22 to the heating device 15.

What is claimed is:

1. A process for preparing sulfuric acid, wherein in a production mode the process comprises:
   oxidizing sulfur to sulfur dioxide in a first oxidation stage;
   catalytically oxidizing the sulfur dioxide to sulfur trioxide in a second oxidation stage; and
   introducing the sulfur trioxide into at least one absorption stage for absorption of the sulfur trioxide, wherein process gases are discharged from the at least one absorption stage in a flow direction,
wherein in a standby mode the process comprises:
   heating the process gases in a heating stage disposed upstream of the second oxidation stage with respect to the flow direction of the process gases,
   feeding the process gases exiting from the at least one absorption stage to the heating stage and
   recirculating the process gases via the heating stage, the second oxidation stage, and the at least one absorption stage while in the standby mode,
   wherein the process gases are not recirculated while in the production mode.

2. The process of claim 1 wherein in the production mode the process comprises feeding sulfur and air for the oxidation to the first oxidation stage, wherein in the standby mode the process comprises stopping the feeding of sulfur and at least throttling back on the feeding of air.

3. The process of claim 1 wherein in the standby mode the process comprises conveying the process gases from the at least one absorption stage, bypassing the first oxidation stage, to the heating stage and from the heating stage to the second oxidation stage.

4. The process of claim 1 wherein the process gases are, after passing through a first part of the second oxidation stage, discharged from the second oxidation stage and
   in the production mode of the process, conveyed through an intermediate absorption stage of the at least one absorption stage and subsequently recirculated to the second oxidation stage where the process gases pass through a second part of the second oxidation stage, and
   in the standby mode of the process, recirculated via a closeable bypass conduit to the second oxidation stage, bypassing the intermediate absorption stage.

5. The process of claim 4 wherein after the process gases pass through the second part of the second oxidation stage, both the production and standby modes of the process comprise introducing the process gases into the at least one absorption stage or a final absorption stage of the at least one absorption stage.

6. The process of claim 4 wherein the standby mode of the process comprises at least throttling back a discharge of the process gases from the absorption stage in the flow direction and introducing the process gases into the heating stage.

* * * * *